United States Patent
Blair et al.

(10) Patent No.: US 11,396,906 B2
(45) Date of Patent: Jul. 26, 2022

(54) BALL SOCKET ASSEMBLY WITH A PRELOAD BEARING

(71) Applicant: Federal-Mogul Motorparts LLC, Southfield, MI (US)

(72) Inventors: John Blair, St. Peters, MO (US); Brian Krueger, Fairview Heights, IL (US); Thomas J. Byrnes, Jr., St. Charles, MO (US)

(73) Assignee: Federal-Mogul Motorparts, LLC, Southfield, MI (US)

( * ) Notice: Subject to any disclaimer, the term of this patent is extended or adjusted under 35 U.S.C. 154(b) by 186 days.

(21) Appl. No.: 16/515,560

(22) Filed: Jul. 18, 2019

(65) Prior Publication Data
US 2020/0025239 A1 Jan. 23, 2020

Related U.S. Application Data

(60) Provisional application No. 62/699,847, filed on Jul. 18, 2018.

(51) Int. Cl.
*F16C 11/06* (2006.01)
*F16C 11/08* (2006.01)

(52) U.S. Cl.
CPC ...... *F16C 11/0628* (2013.01); *F16C 11/0695* (2013.01); *F16C 11/08* (2013.01); *Y10T 403/32737* (2015.01)

(58) Field of Classification Search
CPC .............. F16C 11/0623; F16C 11/0628; F16C 11/0633; F16C 11/0638; F16C 11/0647;
(Continued)

(56) References Cited

U.S. PATENT DOCUMENTS 3,004,786 A * 10/1961 Herbenar ............ F16C 11/0676
403/140
3,168,339 A * 2/1965 Townsend .......... F16C 11/0638
403/138
(Continued)

FOREIGN PATENT DOCUMENTS

DE 857301 C * 11/1952 .......... F16C 11/0628
EP 0924441 A1 * 6/1999 .......... F16C 11/0647
(Continued)

OTHER PUBLICATIONS

"Alloy Steel 5160." Continental Steel and Tube Company, Mar. 25, 2016, [online], [retreived on Jun. 16, 2021], Retreived from the Internet <URL: https://web.archive.org/web/20160325182030/https://continentalsteel.com/carbon-steel/grades/alloy-5160/>. (Year 2016).*

*Primary Examiner* — Michael P Ferguson
*Assistant Examiner* — Kevin J Baynes
(74) *Attorney, Agent, or Firm* — Robert L. Stearns; Dickinson Wright, PLLC

(57) ABSTRACT

The ball socket assembly includes a housing which has at least one open end and an inner bore that extends along a central axis. The ball socket assembly further includes a ball stud that has a ball portion and a shank portion. The ball portion is disposed in the inner bore of the housing, and the shank portion extends out of the inner bore through the at least one open end. At least one bearing is disposed in the inner, and the at least one bearing has a bearing surface which is in direct contact with the ball portion of the ball stud. The at least one bearing is made of a monolithic piece of a spring-like material and has a single gap and is flexed to preload the at least one bearing against the ball portion.

12 Claims, 5 Drawing Sheets

(58) Field of Classification Search
CPC . F16C 11/0652; F16C 11/068; F16C 11/0685; F16C 11/08; F16C 11/083; F16C 11/0695; F16C 11/086; F16C 11/0614; F16C 11/0619; Y10T 403/32713; Y10T 403/32721; Y10T 403/32737; Y10T 403/32762; Y10T 403/32811; Y10T 403/32745; Y10T 403/32754; Y10T 403/32795; Y10T 403/32803
USPC .......................................................... 403/133
See application file for complete search history.

(56) References Cited

U.S. PATENT DOCUMENTS

| | | | | |
|---|---|---|---|---|
| 4,331,367 A * | 5/1982 | Trudeau | ............... | F16C 11/0676 384/202 |
| 4,415,291 A * | 11/1983 | Smith | ................. | F16C 11/0642 403/36 |
| 5,112,153 A * | 5/1992 | Gunn | ................. | F16C 11/0633 403/77 |
| 5,551,791 A * | 9/1996 | Schneider | ................ | B62D 7/16 403/144 |
| 5,882,137 A * | 3/1999 | Epp | .................... | F16C 11/0628 403/135 |
| 6,010,271 A * | 1/2000 | Jackson | .............. | F16C 11/0628 403/131 |
| 6,171,012 B1 * | 1/2001 | Westphal | ............ | F16C 11/0652 403/137 |
| 6,742,955 B2 * | 6/2004 | Moses | ................... | F16C 11/068 403/122 |
| 7,344,311 B2 * | 3/2008 | Lu | ........................... | F16C 11/04 384/192 |
| 8,047,739 B2 * | 11/2011 | Sellers | ................ | F16C 11/0628 403/135 |
| 8,342,769 B2 * | 1/2013 | Elterman | ............ | F16C 11/0642 403/147 |
| 8,747,012 B2 * | 6/2014 | Byrnes | .................. | B62D 7/166 403/135 |
| 8,764,336 B2 * | 7/2014 | Kraatz | ................ | F16C 11/0695 403/137 |
| 9,291,195 B1 * | 3/2016 | Parker | ................... | F16C 11/069 |
| 9,316,250 B2 * | 4/2016 | Elterman | ............ | F16C 11/0604 |
| 2018/0258983 A1 * | 9/2018 | Reddehase | ......... | F16C 11/0628 |

FOREIGN PATENT DOCUMENTS

| | | | |
|---|---|---|---|
| GB | 1019966 A | * 10/1961 | |
| WO | WO-2006110133 A1 | * 10/2006 | ............ F16C 11/069 |

* cited by examiner

BALL SOCKET ASSEMBLY WITH A PRELOAD BEARING

CROSS-REFERENCE TO RELATED APPLICATION

This application claims the benefit of U.S. Provisional Application No. 62/699,847, filed Jul. 18, 2018, the entire contents of which is hereby incorporated by reference.

BACKGROUND OF THE INVENTION

1. Field of the Invention

The present invention is related generally to ball socket assemblies, such as for vehicle suspension systems.

2. Related Art

Socket assemblies of the type that are used in vehicle suspension and steering systems typically include a housing, a ball stud and one or more bearings. The bearings have semi-spherically curved bearing surfaces with radiuses that closely match a radius of a ball portion of the ball stud. Within an inner bore of the housing, the curved bearing surfaces slidably contact the ball portion to allow the ball stud and housing rotate and articulate relative to one another.

One problem with such socket assemblies is that tight manufacturing tolerances are required to establish the slidable contact between the bearing surfaces of the bearings and the ball portion of the ball stud. Another problem is that occasionally, a mechanic will improperly install the socket assembly, which can cause the ball stud to lock up, thus making rotation and articulation of the ball stud and the housing relative to one another difficult.

SUMMARY OF THE INVENTION AND ADVANTAGES

One aspect of the present invention is related to a ball socket assembly that includes a housing. The housing includes at least one open end and an inner bore that extends along a central axis. The ball socket assembly further includes a ball stud that has a ball portion and a shank portion. The ball portion is disposed in the inner bore of the housing, and the shank portion extends out of the inner bore through the at least one open end. At least one bearing is disposed in the inner, and the at least one bearing has a bearing surface which is in direct contact with the ball portion of the ball stud. The at least one bearing is made of a monolithic piece of a spring-like material and has a single gap and is flexed to preload the at least one bearing against the ball portion.

Because the bearings are self-preloaded against the ball portion of the ball stud, the advantages of a preload are achieved in the ball socket assembly according to this aspect of the invention without any additional parts, such as one or more springs, as is common in other preloaded ball socket assemblies. This leads to cost and manufacturing time savings. The gap in the at least one bearing also allows for axial motion of the ball stud during installation to provide more installation tolerance. That is, the ball socket assembly is less likely to lock up from improper installation than other known ball socket assemblies.

According to another aspect of the present invention, the bearing surface of the at least one bearing extends at a generally constant angle relative to the central axis where it contacts the ball portion of the ball stud. Forming a tapered surface the bearing is less costly and requires relaxed manufacturing tolerances in comparison to the curved bearing surfaces found in other known ball socket assemblies.

According to yet another aspect of the present invention, the at least one bearing is made of metal.

According to still another aspect of the present invention, the metal is spring steel.

According to a further aspect of the present invention, the at least one bearing is further defined as a first bearing with a first bearing surface that is frustoconical in shape and a second bearing with a second bearing surface that is frustoconical in shape and wherein the first and second bearings are in slidable contact with opposite hemispheres of the ball portion of the ball stud when the ball stud is oriented along the central axis.

According to yet a further aspect of the present invention, the first and second bearing surfaces are disposed at different acute angles relative to the central axis from one another.

According to still a further aspect of the present invention, the ball socket assembly further includes a radial ring which, in an axial direction, is disposed between the first and second bearings within the inner bore of the housing. The radial ring has a third bearing surface that is in slidable contact with an equator of the ball portion of the ball stud when the ball stud is oriented along the central axis.

According to another aspect of the present invention, the at least one open end of the housing is further defined as a first open end and a second open end, the shank portion extends out of the inner bore through the first open end, and a cover plate closes the second open end.

According to yet another aspect of the present invention, no washer springs are disposed in the inner bore of the housing.

According to still another aspect of the present invention, the bearing surface that is frustoconical in shape includes a plurality of lubrication groove.

According to a further aspect of the present invention, the at least one bearing with the bearing surface that is frustoconical in shape is further defined as only one bearing with said bearing surface that is frustoconical in shape.

According to yet a further aspect of the present invention, the ball socket assembly further includes an additional bearing that has a semi-spherically curved bearing surface that is in slidable contact with the ball portion of the ball stud.

Another aspect of the present invention is related to a method of making a ball socket assembly. The method includes the step of inserting at least one bearing, which has a bearing surface, into an inner bore of a housing. The bearing is made as a monolithic piece of a spring-like material and has end faces that are spaced from one another by a gap. The method continues with the step of inserting a ball portion of a ball stud into the inner bore of the housing and establishing direct contact between the ball portion and the bearing surface of the at least one bearing. The method proceeds with the step of flexing the at least one bearing radially outwardly to preload the at least one bearing against the ball portion of the ball stud.

According to another aspect of the present invention, the bearing surface of the at least one bearing is generally frusto-conical in shape.

According to yet another aspect of the present invention, the at least one bearing is made of spring steel.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENTS

Referring to the Figures, wherein like numerals indicate corresponding parts throughout the several views, one aspect of the present invention is related to an improved ball socket assembly 20 (also known as a ball joint). In the exemplary embodiment, the ball socket assembly 20 is configured to attached two components of a vehicle suspension (such as a control arm 21 and a knuckle) and/or steering system (such as a tie rod end and a knuckle). However, it should be appreciated that the ball socket assembly 20 could find uses in other applications, both automotive and non-automotive.

Figure 1:
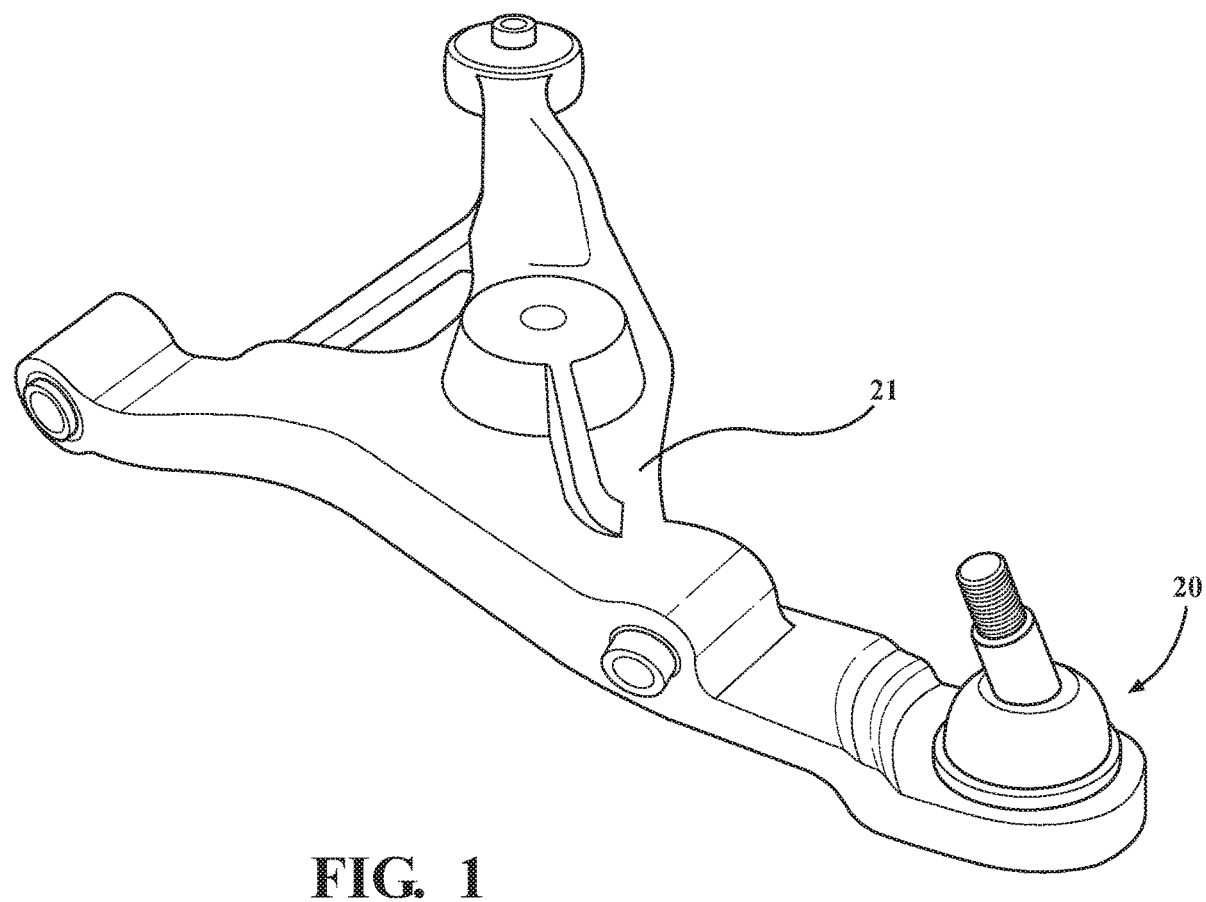
FIG. 1 is a perspective elevation view of a control arm assembly including a ball socket assembly that is constructed according to one aspect of the present invention.
Figure 2:
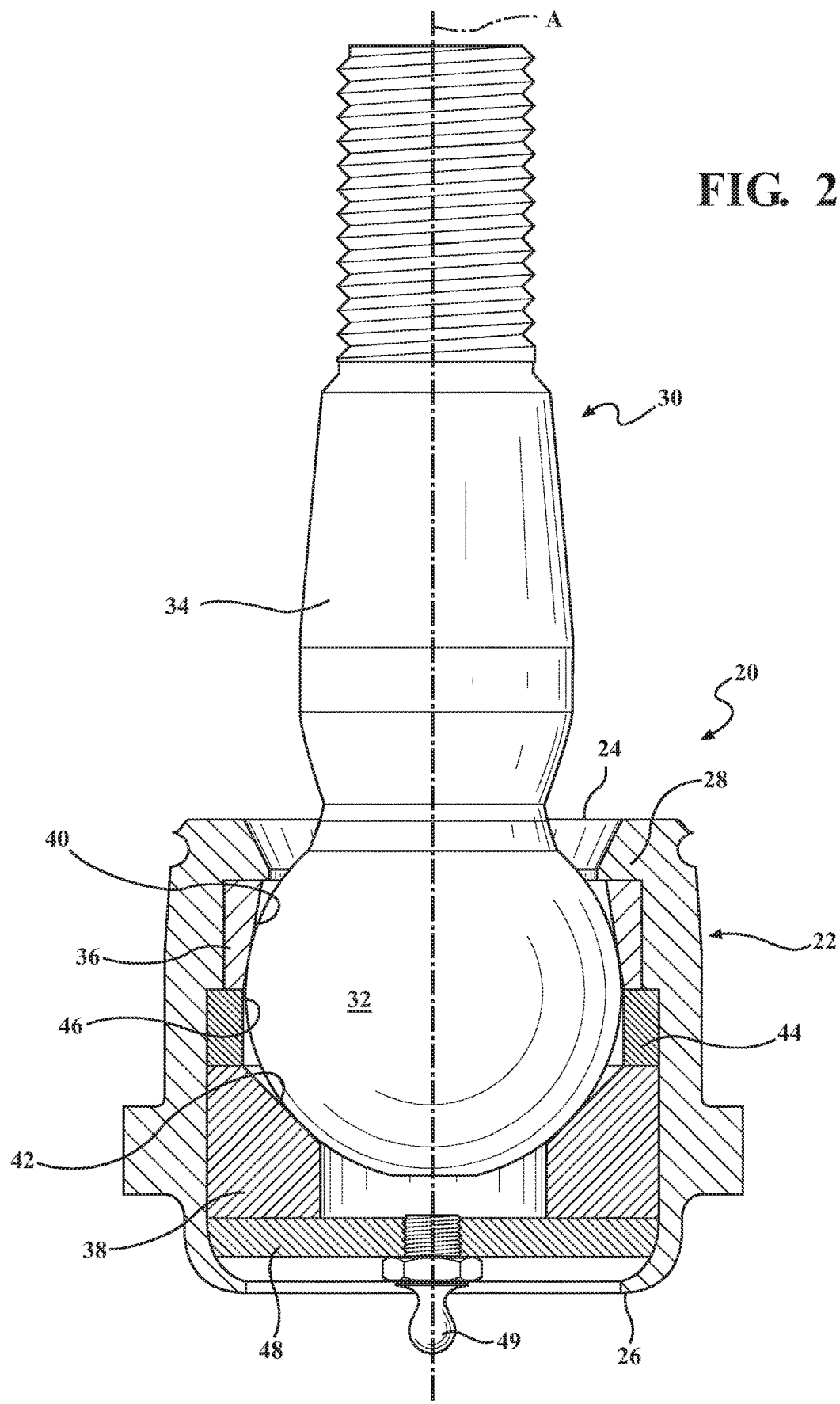
FIG. 2 is a partially cross-sectional view of a first exemplary embodiment of the ball socket assembly.
Figure 3:
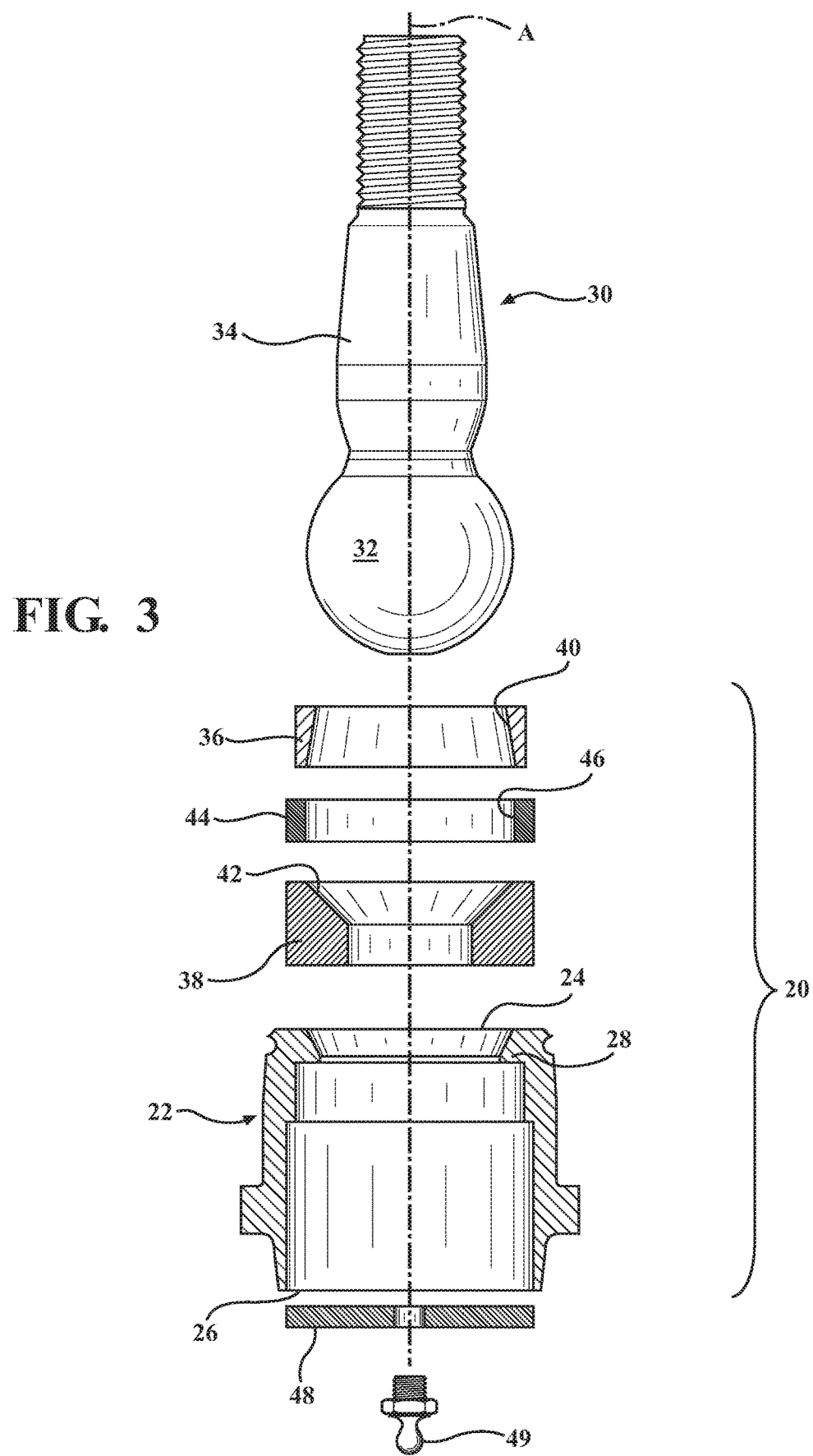
FIG. 3 is an exploded and partially cross-sectional view of the ball socket assembly of FIG. 2.

With reference to FIGS. 2 and 3, a first exemplary of the ball socket assembly 20 includes a housing 22 with an outer surface and an inner surface. The inner surface surrounds an inner bore which extends along a central axis A from an open first end 24 to an open second end 26. Adjacent the first end 24, the housing 22 presents a radially inwardly extending flange 28 with a tapered upper surface. The housing 22 is preferably made of a single, monolithic piece of metal, such as steel or an alloy steel and is preferably shaped through casting or forging before machining at least the inner surface to its final form. In the exemplary embodiment, the housing 22 is of a cartridge-style construction in that it is configured to be pressed into an opening of another component, such as the control arm 21 shown in FIG. 1. However, it should be appreciated that the housing 22 could alternately be built into another component, such as a tie rod end.

The ball socket assembly 22 further includes a ball stud 30 that has a ball portion 32 and a shank portion 34. The ball portion 32 is disposed in the inner bore of the housing and has a generally semi-spherically curved outer surface. The shank portion 34 projects out of the inner bore through the open first end of the housing 22 for attachment with another component. The ball stud 30 is preferably made of a single, monolithic piece of metal, such as steel or an alloy steel and may be shaped through any suitable means, e.g., casting or forging.

The ball socket assembly 20 additionally includes a pair of bearings 36, 38 (hereinafter referred to as a first bearing 36 and a second bearing 38) that are disposed in the inner bore between the inner surface of the housing 22 and are in slidable contact with opposite hemispheres the ball portion 32 of the ball stud 30 when the ball stud 30 is oriented along the central axis A. The first bearing 36 is disposed adjacent the open first end 24 of the housing 22 and is in direct contact with the radially inwardly extending flange 28 of the housing 22. The second bearing 38 is disposed adjacent the open second end 26 of the housing 22. The first bearing 36 has a first bearing surface 40 which is in direct contact with the ball portion 32 of the ball stud 30, and the second bearing 38 has a second bearing surface 42 which is also in direct contact with the ball portion 32. When the ball stud 30 is oriented along the central axis A, the first and second bearing surfaces 40, 42 are in contact with opposite hemispheres of the ball portion 32.

The radial ring 44 is sandwiched in the axial direction between a shoulder on the inner surface of the housing 22 and an upper surface of the second bearing 38. The radial ring 44 has a third bearing surface 46 that has a cylindrical shape and that is in contact with an equator of the ball portion 32 of the ball stud 30 when the ball stud 30 is aligned along the central axis A.

A cover plate 48 is disposed in the inner bore adjacent the open second end 26, and a lower edge of the housing 22 is deformed (such as through swaging) and thereby capture the bearings 36, 38, the radial ring 44, and the ball portion 32 of the ball stud 30 in the inner bore of the housing 22. The cover plate 48 is preferably pressed into the groove but could alternately be secured with the housing 22 through other means, such as threading. In the exemplary embodiment, the cover plate 48 is in direct contact with a lower surface of the second bearing 38. The cover plate 48 includes an opening which is configured to receive a Zerk fitting 49 for injecting a lubricant (such as grease) into the inner bore during initial assembly and regular maintenance of the ball socket assembly 20.

Referring additionally to FIGS. 4, 5, 8, and 9, each of the first and second bearings 36, 38 has a pair of end faces 50 that are spaced apart from one another by a gap. That is, neither the first bearing 36 nor the second bearing 38 extends the full three hundred and sixty degrees (360°) around the central axis A. The respective first and second bearing surfaces 40, 42 also extend around the central axis A from one of the end faces 50 to the other end face 50. The radial ring 44 has no such gap, and thus, the third bearing surface 46 of the radial ring 44 does extend the full three hundred and sixty degrees (360°) around the central axis A.

Figure 4:
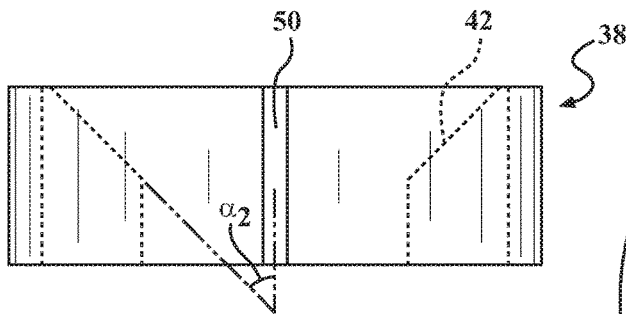
FIG. 4 is a cross-sectional view of a second bearing of the ball socket assembly of FIGS. 2 and 3.
Figure 7:
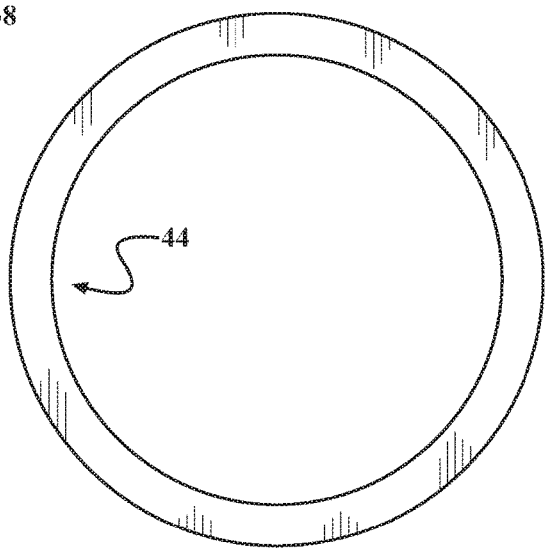
FIG. 7 is a top elevation view of the radial ring of FIG. 6.
Figure 8:
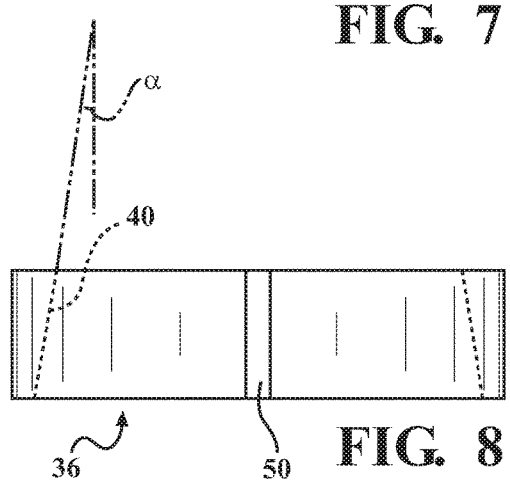
FIG. 8 is a cross-sectional view of a first bearing of the socket assembly of FIGS. 2 and 3.
Figure 6:
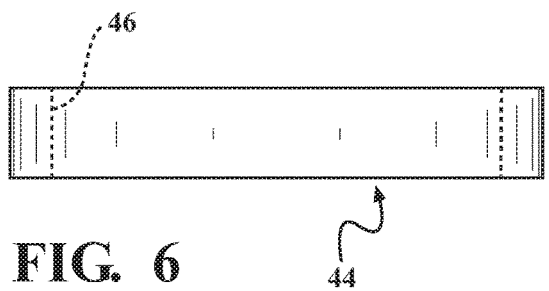
FIG. 6 is a cross-sectional view of a radial ring of the ball socket assembly of FIGS. 2 and 3.
Figure 9:
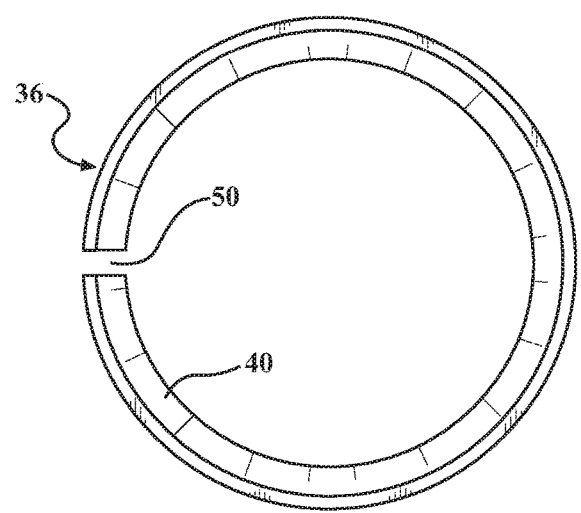
FIG. 9 is a top elevation view of the first bearing of FIG. 8.

As shown in FIGS. 4 and 8, each of the first and second bearing surfaces 40, 42 is frustoconical in shape. That is, as viewed in cross-section, each of these bearing surfaces 40, 42 extends linearly (i.e., at a generally constant angle relative to the central axis) from a radially inner end to a radially outer end. Thus, the semi-spherical outer surface of the ball portion 32 of the ball stud 30 contacts each of the tapered bearing surfaces 40, 42 at a line of contact which extends circumferentially from one of the end faces 50 to the other end face 50. This is in contrast to other known socket assemblies which have a much greater surface of contact between the bearing and the ball portion of the ball stud. The second bearing 38 further includes a cylindrical inner face 52 which extends axially from the radially inner end of the second bearing surface to the lower surface of the second bearing 38. As shown in FIG. 1, the ball portion 32 of the ball stud 30 extends partially into the cylindrical portion of the second bearing 38 such that the ball portion 32 remains spaced from (i.e., out of contact with) the cover plate 48.

Figure 5:
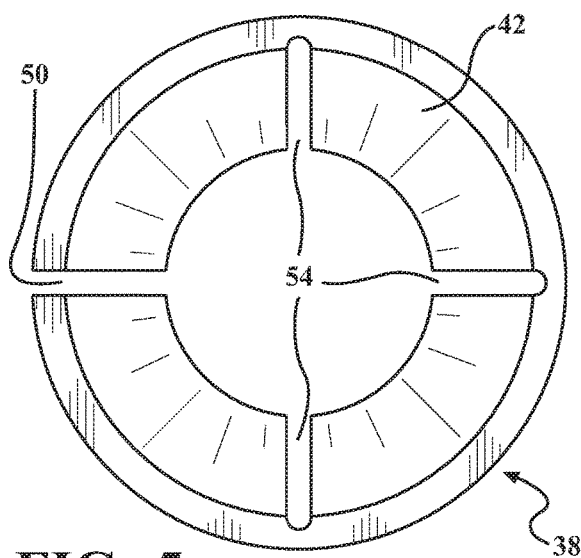
FIG. 5 is a top elevation view of the second bearing of FIG. 4.

Referring now to FIGS. 4 and 8, the first bearing surface 40 extends at a first angle $\alpha_1$ relative to the central axis A, and the second bearing surface 42 extends at a second angle $\alpha_2$ relative to the central axis A. The second angle $\alpha_2$ is greater than the first angle $\alpha_1$. As shown in FIG. 5, the second bearing surface 42 includes a plurality of lubricant grooves 54 formed therein for conveying grease past the second bearing 38 to lubricate the contact areas between the ball portion 32 of the ball stud 30 and the second and third bearing surfaces 42, 46.

The first and second bearings 36, 38 are made as respective monolithic pieces of a material that has spring-like properties, i.e., a hard material that can be elastically deformed whereupon internal stresses urge the material towards a resting condition. The combination of the spring-like material of the bearings 36, 38 and the gaps between the end faces 50 allows the bearings 36, 38 to flex open and closed. In the exemplary embodiment, the first and second bearings 36, 38 are made of 5160 spring steel which is tempered at approximately 400 degrees Fahrenheit to obtain an HRC level of 58 on the Rockwell scale. The first and second bearings 36, 38 may be made through any suitable operation including, for example die casting or stamping.

As the cover plate 48 is fixed with the housing 22, the second bearing 38 is urged against the ball portion 32 of the ball stud 30. The ball portion 32 is generally incompressible, and thus, this action causes both of the first and second bearings 36, 38 to flex open. Internal stresses within the first and second bearings 36, 38 urge the first and second bearing surfaces 40, 42 radially inwardly and against the ball portion 32. Thus, the first and second bearings 36, 38 are preloaded against the ball portion 32 of the ball stud 30. The amount of preload force is controlled by the amount of flex that is set during the assembly process, and during the operating life of the ball socket assembly 20, the first and second bearings 36 can close upon the ball portion 32 in response to wear, thereby increasing the operating life of the ball socket assembly 20 as compared to other known socket assemblies. The preload is established without any additional springs or other components that are found in other known preloaded ball socket assemblies.

Figure 11:
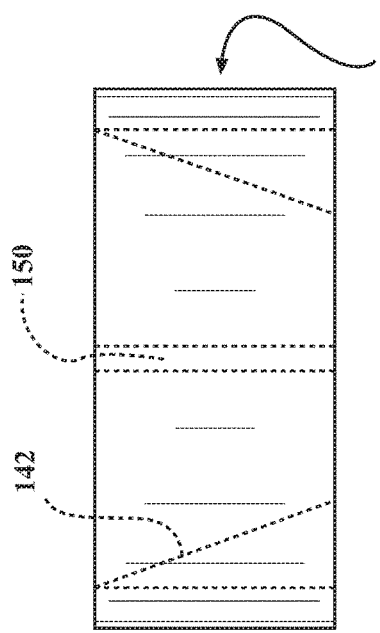
FIG. 11 is a cross-sectional view of a first bearing of the ball socket assembly of FIG. 10.
Figure 12:
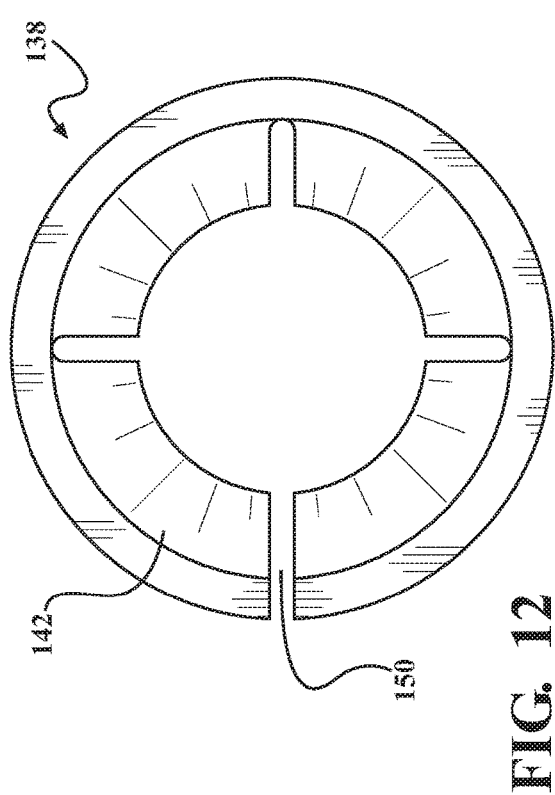
FIG. 12 is a top elevation view of the first bearing of FIG. 10.
Figure 10:
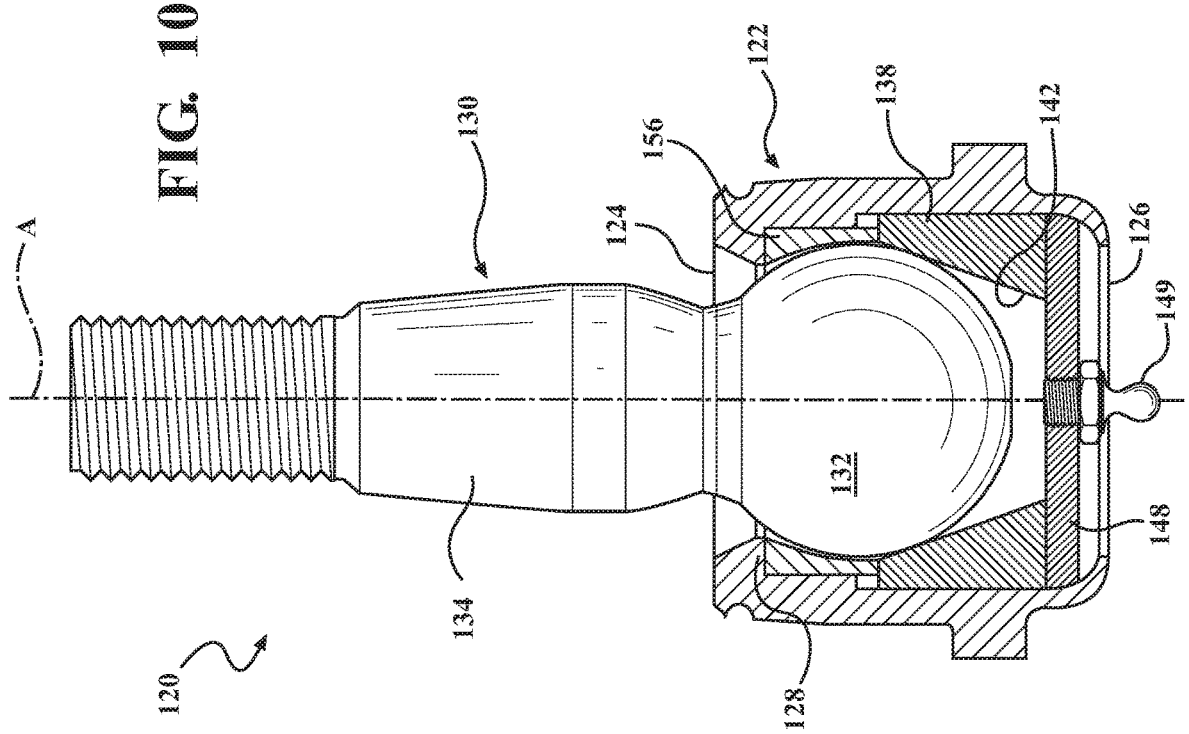
FIG. 10 is a partially cross-sectional view of a second exemplary embodiment of the ball socket assembly.

Referring now to FIGS. 10 and 11, a second exemplary embodiment of the ball socket assembly 120 is generally shown with like numerals, separated by a prefix of "1", designating similar elements.

In the second embodiment, the ball socket assembly 120 includes two bearings 138, 156, but only one of the bearings 138 has a frustoconically shaped bearing surface 142. The other, additional bearing 156 has a semi-spherically curved bearing surface with a similar radius of curvature to the ball portion 132 of the ball stud 130. Also, in this embodiment, only one of the bearings 138, 156 has a frustoconically shaped bearing surface and has a gap, and it is only this bearing 138 that flexes during the assembly operation to preload the ball stud 130.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other. It should also be appreciated that directional terms, such as "top" and "upper" are in reference to the orientation of the ball socket assembly in one or more of the drawings and are not intended to require the ball socket assembly to be in any particular orientation.

What is claimed is:

1. A ball socket assembly, comprising:
    a housing comprising an inner bore extending along a central axis between a first open end and a second end, wherein the first open end defines a first shoulder;
    said inner bore comprising a first diameter portion adjacent said first open end and a larger diameter portion adjacent said second end, wherein a second shoulder separates said first diameter portion and said larger diameter portion;
    a ball stud, said ball stud having a ball portion and a shank portion;
    said ball portion being disposed in said inner bore of said housing and said shank portion extending out of said inner bore through said first open end;
    a first bearing received in said inner bore of said housing and contacting said first shoulder and having a first bearing surface that contacts said ball portion of said ball stud;
    a second bearing disposed in said inner bore having a second bearing surface which is in direct contact with said ball portion of said ball stud and captured within said inner bore via said second end of said housing;
    a radial ring sandwiched between said second shoulder and said second bearing and being in contact with an equator of said ball portion of said ball stud; and
    said second bearing being clamped between said second end and said radial ring and being made of a monolithic piece of spring material and having a single gap and is flexed to preload said second bearing against said ball portion and to preload said radial ring against said second shoulder without any additional springs or other spring components.

2. The ball socket assembly of claim 1 wherein said second bearing surface of said second bearing extends at a generally constant angle relative to said central axis where it contacts said ball portion of said ball stud.

3. The ball socket assembly as set forth in claim 2 wherein said second bearing is made of metal.

4. The ball socket assembly as set forth in claim 3 wherein said second bearing is made of spring steel.

5. The ball socket assembly as set forth in claim 1 wherein said first and second bearing surfaces are disposed at different acute angles relative to said central axis from one another.

6. The ball socket assembly as set forth in claim 1 wherein said second end of said housing is further defined as a second open end and wherein a cover plate closes said second open end.

7. The ball socket assembly as set forth in claim 1 wherein no washer springs are disposed in said inner bore of said housing.

8. The ball socket assembly as set forth in claim 1 wherein said second bearing surface includes a plurality of lubrication grooves.

9. A method of making a ball socket assembly, comprising the steps of:
    providing a housing that has an inner bore that extends along a central axis between a first open end and a second end, wherein said first open end defines a first shoulder;

said inner bore comprising a first diameter portion adjacent said first open end and a larger diameter portion adjacent said second end, wherein a second shoulder separates said first diameter portion and said larger diameter portion;

inserting a first bearing that has a first bearing surface into said inner bore of said housing, the first bearing contacting said first shoulder and being made of a monolithic piece of a spring material;

inserting a ball portion of a ball stud into the inner bore of the housing and establishing direct contact between the ball portion and the first bearing surface of the first bearing, wherein a shank portion of said ball stud extends out of said inner bore through said first open end;

inserting a radial ring into the inner bore of the housing against said second shoulder and into contact with an equator of the ball portion of the ball stud;

inserting a second bearing into the inner bore of the housing and capturing said second bearing within said inner bore via said second end of said housing, the second bearing having a pair of end faces that are spaced from one another by a gap, the second bearing having a second bearing surface in contact with the ball portion of the ball stud, and wherein said second bearing is clamped between said second end of said housing and said radial ring and said radial ring is sandwiched between said second shoulder and said second bearing; and flexing the second bearing radially outwardly to preload the second bearing surface against the ball portion of the ball stud and to bias the radial ring against the second shoulder without any additional springs or spring components.

10. The method as set forth in claim 9 wherein the first and second bearing surfaces are generally frustoconical in shape.

11. The method as set forth in claim 9 wherein the first and second bearings are made of spring steel.

12. The method as set forth in claim 9 wherein the second bearing further comprises a single gap and comprising flexing the second bearing radially outwardly to preload the second bearing surface against the ball portion of the ball stud.

* * * * *